(12) United States Patent
Webb

(10) Patent No.: US 11,585,473 B2
(45) Date of Patent: Feb. 21, 2023

(54) SELF-ALIGNING PIPE COUPLING

(71) Applicant: TAYLOR KERR (COUPLINGS) LIMITED, Buckinghamshire (GB)

(72) Inventor: Christopher Richard Webb, Buckinghamshire (GB)

(73) Assignee: Taylor Kerr (Couplings) Limited, Buckinghamshire (GB)

(*) Notice: Subject to any disclaimer, the term of this patent is extended or adjusted under 35 U.S.C. 154(b) by 792 days.

(21) Appl. No.: 16/306,158

(22) PCT Filed: Jun. 1, 2017

(86) PCT No.: PCT/GB2017/051583
§ 371 (c)(1),
(2) Date: Nov. 30, 2018

(87) PCT Pub. No.: WO2017/208007
PCT Pub. Date: Dec. 7, 2017

(65) Prior Publication Data
US 2020/0109801 A1    Apr. 9, 2020

(30) Foreign Application Priority Data
Jun. 1, 2016  (GB) ..................... 1609561

(51) Int. Cl.
*F16L 21/06* (2006.01)
*F16L 3/01* (2006.01)
(Continued)

(52) U.S. Cl.
CPC .............. *F16L 21/065* (2013.01); *F16L 3/01* (2013.01); *F16L 17/04* (2013.01); *F16L 37/091* (2013.01)

(58) Field of Classification Search
CPC ........ F16L 21/065; F16L 17/04; F16L 37/091
(Continued)

(56) References Cited

U.S. PATENT DOCUMENTS

| 466,521 | A | * | 1/1892 | Fitts | ..................... | F16L 37/252 |
| | | | | | | 285/27 |
| 882,406 | A | * | 3/1908 | Morgan | ................ | F16L 37/252 |
| | | | | | | 285/27 |

(Continued)

FOREIGN PATENT DOCUMENTS

| GB | 2275089 A | 8/1994 |
| GB | 2447149 A | 9/2008 |

(Continued)

OTHER PUBLICATIONS

International Search Report for Application No. PCT/GB2017/051583 dated Jul. 25, 2017.

*Primary Examiner* — Zachary T Dragicevich
*Assistant Examiner* — Fannie C Kee
(74) *Attorney, Agent, or Firm* — Young Basile Hanlon & MacFarlane, P.C.

(57) ABSTRACT

A pipe coupling for connecting together the ends of two pipes. The pipe coupling including: a tubular casing for fitting around the pipes; a tensioning system for tightening the casing around the outer surface of the pipes; and a guide member, coupled to and extending away from a first axial end of the tubular casing, for radially aligning and guiding one of the pipes into the tubular casing. Further including an assembly having a pipe coupling and a pipe, the pipe coupling being pre-installed on one end of the pipe, and configured to receive a second pipe.

18 Claims, 14 Drawing Sheets

(51) Int. Cl.
*F16L 17/04* (2006.01)
*F16L 37/091* (2006.01)

(58) Field of Classification Search
USPC .................................................. 285/27, 420
See application file for complete search history.

(56) References Cited

U.S. PATENT DOCUMENTS

| | | | | |
|---|---|---|---|---|
| 2,290,403 | A * | 7/1942 | Wyss | F16L 37/248 285/6 |
| 2,803,473 | A * | 8/1957 | Hohmann | B64D 39/06 137/614.04 |
| 3,096,999 | A * | 7/1963 | Ahlstone | F16L 37/002 166/340 |
| 3,231,297 | A * | 1/1966 | Watts | F16L 23/04 285/24 |
| 3,475,038 | A * | 10/1969 | Matherne | E21B 19/24 285/27 |
| 3,551,983 | A * | 1/1971 | Newbury | F16L 3/18 29/234 |
| 6,682,105 | B2 * | 1/2004 | Latham | F16L 21/08 285/148.28 |
| 7,832,487 | B2 * | 11/2010 | Jensen | E21B 19/24 166/380 |
| 9,631,750 | B1 | 4/2017 | Veazey | |
| 9,644,443 | B1 * | 5/2017 | Johansen | E21B 33/038 |
| 2005/0017510 | A1 * | 1/2005 | Rigollet | F16L 23/20 285/367 |
| 2013/0207389 | A1 * | 8/2013 | Rigollet | F16L 23/04 285/407 |
| 2017/0254454 | A1 * | 9/2017 | Vosgeois | F16L 23/08 |

FOREIGN PATENT DOCUMENTS

| | | |
|---|---|---|
| GB | 2517979 A | 3/2015 |
| SU | 454323 A1 | 12/1974 |

* cited by examiner

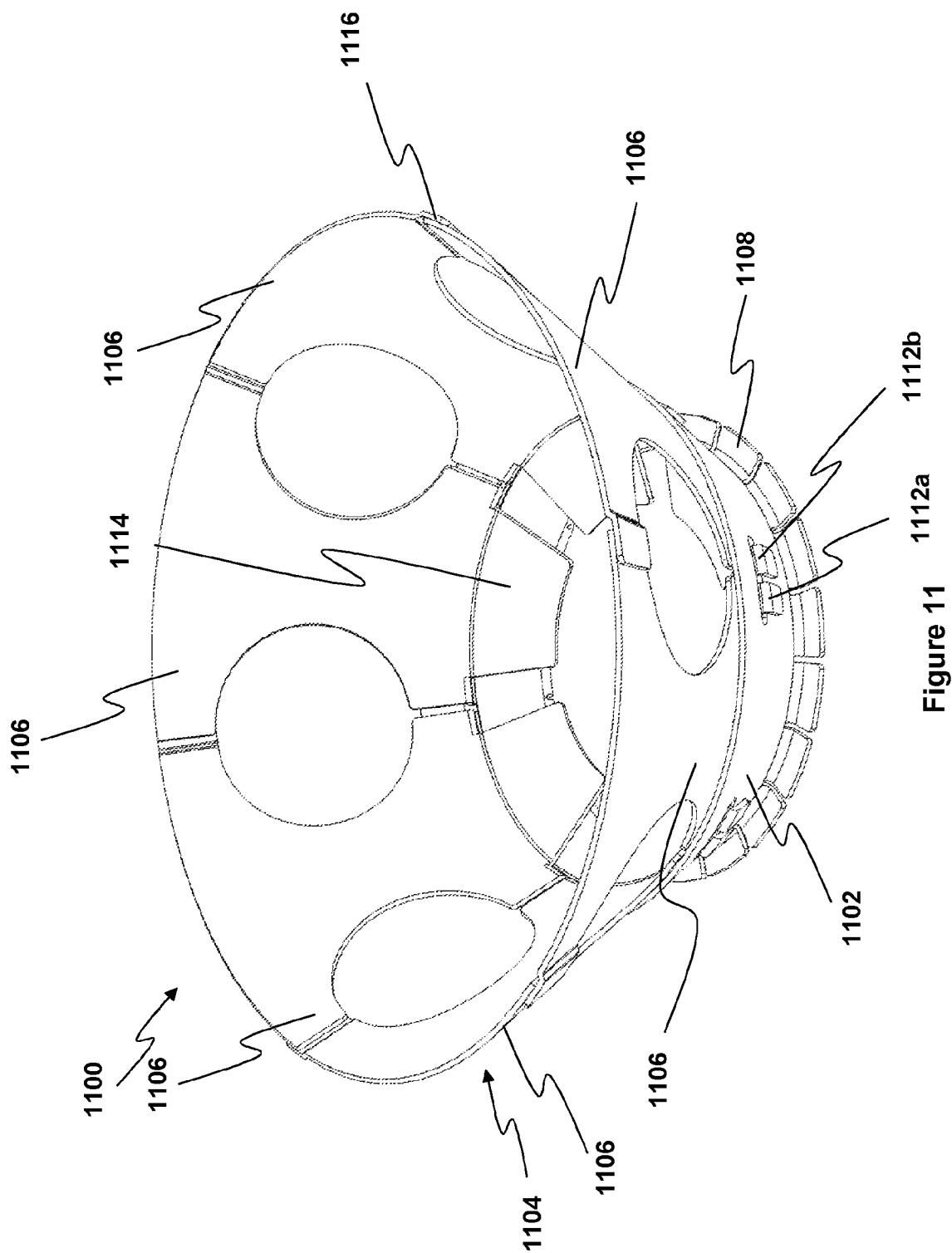

SELF-ALIGNING PIPE COUPLING

The present invention relates to self-aligning pipe couplings. The pipe couplings find particular use during construction of poured concrete pilings.

In building construction using cast in-situ pilings, there is a need to ensure the integrity of the pilings. The process of casting piles in-situ involves boring the pile, lowering reinforcement cage into the pile, and pouring concrete into the pile to form the piling. Often, piles are too deep to use a single section of cage, and therefore in these situations multiple sections of cage are connected to each other as they are lowered into the pile. To ensure the integrity of the pile, pipes are often lowered into the pile within the reinforcement caging to enable test equipment to be lowered into the piling. In addition, pipes may be provided which enables base grouting of the pile once the concrete has been poured and is sufficiently stable. Since pilings may be 100 m or more deep, multiple sections of piping are required, which must be coupled together in a fluid tight manner. Often the sections of piping are the same length as the sections of cage and are coupled together at the same time as the cage sections are connected together.

To enable testing of the piling, at least two pipes are provided to receive probes; an ultrasonic emitter, and an ultrasonic sonic receiver. The receiver and emitter are both lowered to the bottom of their respective pipes, and slowly brought to the surface. The emitted signal is received by the receiver and a determination of the integrity of the piling can be made. The test equipment plots the travel time between the pipes versus the depth in the pile. If the travel time is substantially constant, it is assumed that there is no change in concrete quality with depth. However, a sudden increase of the travel time at any depth indicates a defect. As will be appreciated, it is critical that the pipes are fluid tight to prevent the ingress of concrete which would impair or prevent such testing.

If required, at least one further pipe is provided to enable base grouting. The base grouting process entails installation of a grout delivery system, which comprises a plurality of pipes coupled by pipe couplings, during the reinforcing cage preparation. Concrete is then poured around the pipes, and then grout is injected under high pressure once the concrete has gained sufficient strength. The bottom of the pipe is provided with a burst disc to prevent ingress of concrete during the initial pour. The grout is then pumped into the pipe under sufficient pressure to burst the disc. The in situ soil at the toe and any debris left by the drilling process is compressed by the grout. As a result, the ultimate end bearing resistance can typically be increased as compared to a piling that has not been base grouted.

In both cases, the pilings may be 100 m deep or more, and so the fluid pressure of the concrete can be significant. It is thus a requirement that the pipe couplings are capable of withstanding at least 80 bar pressure. Indeed, the burst disc for base grouting may be typically rated at 80 bar burst pressure.

In addition to the pressure requirements of the pipe couplings, there is a requirement that the couplings may be installed quickly and easily. Present systems often use threaded couplings, which require the installer to reach through the cage to thread the pipe sections together before the cage and pipes are lowered into the pile. Such an operation may be hazardous to the installer since the cage and pipes are large, heavy and difficult to manoeuvre.

It is therefore an object of the present invention to provide a pipe coupling which can withstand high fluid pressure, while reducing the requirement for installer input.

According to a first aspect of the present invention, there is provided a pipe coupling for connecting together the ends of two pipes. The pipe coupling comprises: a tubular casing for fitting around the pipes; a tensioning system for tightening the casing around the outer surface of the pipes; and a guide member, coupled to, and extending away, from a first axial end of the tubular casing, for radially aligning and guiding one of the pipes into the tubular casing.

By providing a guide member coupled to an axial end of the pipe coupling, the requirement for physical input from the installer can be minimised. In use, the pipe coupling is preferably pre-installed onto one end of a pipe. The pipe is then lowered into the piling, or the like, until the end of the pipe comprising the coupling is approximately at the top of the piling. A second pipe is then lowered, together with a reinforcement cage, to be coupled to the second pipe. During the step of lowering the pipe, the installer may use a guide arm to ensure the second pipe is received into the guide member of the pipe coupling. No further input is required by the installer for the pipe to be fully received in the tubular casing. The installer then tightens the casing using the tensioning system. Preferably, the installer remotely tightens the coupling, such that at no time will the installers hands or arms be required to be placed within the cage.

As used herein, the term "axial" is used to refer to the direction defined by the longitudinal axis of the pipe and the term "radial" is used to refer to a direction defined by a radius of the pipe.

Preferably, the guide member is frusto-conical, the diameter of the free end of the guide member being greater than the diameter of the end coupled to the casing. Providing a frusto-conical shaped guide member enables the pipe to be more easily guided into the tubular casing.

The guide member may be configured such that a longitudinal axis of the frusto-conical guide member is at an angle to a longitudinal axis of the pipe coupling. Providing a guide member with an angular offset reduces the clearance required between one side of the pipe coupling and the reinforcement cage of the piling. The longitudinal axis of the frusto-conical guide member may be at an angle of between about 10 degrees and about 40 degrees to the longitudinal axis of the pipe coupling, preferably between about 25 degrees and about 35 degrees. The longitudinal axis of the frusto-conical may displaced from the longitudinal axis of the pipe coupling at the first axial end of the tubular casing, such that the apparent radius of the free end of the guide member is greater than the radius of the inner surface of the tubular casing. In this way, any point of the free end of the guide member, when projected to the first axial end of the tubular casing, falls outside of the inner surface of the tubular casing, enabling the pipe to be inserted more easily.

The diameter of the free end of the guide member may be between about 1.5 times and about 3 times the diameter of the end coupled to the casing. The cone angle of the frusto-conical guide member may be between about 30 degrees and about 90 degrees, preferably between about 40 degrees and about 80 degrees, more preferably between about 50 degrees and about 60 degrees. As used herein, the term cone angle refers to the angle formed between the edges of the frusto-conical shape when view in cross-section through the longitudinal axis.

The frusto-conical guide member is formed of an arcuate flat sheet having a hole on a first edge, configured to receive a foldable tab provided on a second opposing edge to retain the guide member in the frusto-conical shape.

The guide member may comprise a plurality of holes disposed around the circumference. Providing a plurality of holes in this way may enable the concrete to flow more easily around the pipe coupling to prevent voids which would reduce the integrity of the piling. Preferably, the holes are spaced apart substantially evenly around the circumference of the guide member. The diameter of each hole may be between about 0.25 times and about 0.75 times the internal diameter of the tubular casing.

Alternatively to providing a frusto-conical guide member, the guide member may comprise a plurality of elongate fingers, each finger extending radially and axially from the first axial end of the casing. Each finger may extend radially and axially away from the casing at an angle to the longitudinal axis of the coupling of between about 30 degrees and about 90 degrees, preferably between about 40 degrees and about 80 degrees, more preferably between about 50 degrees and about 60 degrees.

The guide member may comprises at least three fingers, preferably between three and seven fingers. The fingers are preferably substantially evenly spaced apart around the circumference of the first axial end of the tubular casing. The fingers are preferably spaced such that the distance between the fingers is less than the diameter of the pipes to be coupled. Each finger may be rigidly attached, for example by welding, to the casing. The end of each finger is preferably rounded.

The guide member may comprise a first portion coupled to the first axial end of the tubular casing, and a second portion, the second portion of the guide member comprising a plurality of articulated members configured to rotate about the first portion upon insertion of a pipe into the tubular casing via the guide member. In this way, upon insertion of a pipe into the tubular casing, the ends of the articulated members corresponding to the free end of the guide member rotate towards the pipe, reducing the free space between the guide member and the pipe coupling. Advantageously, this may enable a more effective fill of concrete within the piling, and provides a visual indication that the pipe is fully inserted into the coupling. The guide member may comprise three, four, five, six, seven, or eight articulated members.

Each articulated member preferably comprises an activation tab configured to radially project inwardly from the guide member, wherein upon insertion of a pipe into the tubular casing, the pipe acts on each tab to rotate each articulated member such that the free end of the guide member moves towards the pipe.

Each articulated member preferably comprises at least two articulation tabs configured to engage with the first portion of the guide member to enable articulation. The at least two articulation tabs on each articulation member are preferably substantially the same length. Adjacent articulation members, proceeding around the first portion of the guide member, may have different length articulation tabs. That is to say, a first set of articulation members may be provided with articulation tabs having a first length, and a second set may be provided with a second length, the first set interposed with the second set such that the articulation members having different length articulation tabs are adjacent each other about the first portion of the guide member. In this way, the first set of articulation members rotate inwardly at a different rate to the second set of articulation members upon insertion of the pipe so that they are less likely to foul against each other.

The first portion of the guide member may comprise a plurality of elongate slits, each slit configured to receive a respective one of the activation tabs, the articulation tabs being configured to abut an outer surface of the first portion of the guide member adjacent said elongate slit. Each elongate slit is preferably arranged to extend circumferentially around the first portion of the guide member. In this embodiment, the activation tab of each articulation member is inserted into the elongate slit from the outside of the first portion of the guide member.

Alternatively, the first portion of the guide member may comprise a plurality of elongate slits, each slit configured to receive an articulation tab from a first articulation member and an articulation tab from a second articulation member adjacent the first articulation member. Each elongate slit is preferably arranged to extend circumferentially around the first portion of the guide member. In this embodiment, the articulation tabs of each articulation member are inserted into the elongate slit from the inside of the first portion of the guide member.

Each articulation member comprises a stop, on a first edge, configured to engage with a second edge of an adjacent articulation member to form a frusto-conical guide member from the plurality of articulation members. The first edge of the articulation member having said stop is preferably a side edge. The second edge of the articulation member preferably comprises a recess configured to receive the stop.

Each articulation member is preferably formed of an arcuate flat sheet, having, where provided the articulation tabs and an activation tab. The first portion of the guide member is preferably formed of an arcuate flat sheet. The flat sheet is preferably provided with a plurality of tabs along an edge configured to engage with the tubular casing. The flat sheet is preferably sized so as to provide a gap between the edges when formed into a frusto-conical shape to enable the first portion of the guide member to reduce in diameter upon tightening of the pipe coupling about the pipe.

The guide member is preferably formed of steel, such as stainless steel. The tubular casing is preferably also formed of steel, such as stainless steel. The stainless steel may be 1.4003 stainless steel, or any other suitable type of stainless steel.

The pipe coupling may further comprise a second guide member provided at the other end of the pipe coupling such that a pipe coupling is provided which comprises two guide members. In this way, the installation of the pipe coupling may be further simplified.

The tubular casing is preferably of generally U-shaped cross-section having a web portion with flanges projecting radially inwardly from the axial ends of the web portion to define an annular channel. The guide member preferably comprises a plurality of tabs. The annular flange at the first axial end of the casing couples the guide member to the casing by slidably retaining the plurality of tabs. By slidably retaining the guide member, the casing can be tightened around the pipes, and therefore reduced in diameter, without the requirement of the guide member also being required to reduce in diameter.

Each of the plurality of tabs preferably projects radially outwardly from the guide member, such that each tab is substantially parallel to the flanges of the casing.

The tubular casing preferably comprises a longitudinal gap between a first free end and a second free end, and a bridging member extending across the gap. The bridge plate may be coupled to one of the first free end or the second free end of the tubular casing.

The bridge plate may be welded, bonded or soldered to one of the first free end or the second free end of the tubular casing. Coupling the bridge plate to the tubular casing enables the pipe coupling to be installed more easily.

The tubular casing will typically be formed of a strip of metal or other material formed into a tube with a gap extending longitudinally of the casing between the free ends of the strip, wherein the free ends of the strip are interconnected by the tensioning system. The bridge plate will therefore typically be formed in a part-cylindrical shape with a radius of curvature similar to that of the casing. The casing on either side of the longitudinal gap overlaps with the bridge plate.

In certain embodiments of the invention, where provided, the bridge plate may extend substantially around the full circumference of the pipe coupling. In these embodiments, the tubular casing comprises an outer casing as described above and the bridge plate as an inner casing fitted within the outer casing. Preferably, the inner casing is fitted entirely within the outer casing. The outer casing and inner casing preferably both have longitudinal gaps wherein the gap in the inner casing is circumferentially offset from the gap in the outer casing. A suitable arrangement of outer and inner casings would be known to the skilled person and is described, for example, in GB-A-2 275 089.

Preferably, the pipe coupling further comprises a tubular sealing gasket disposed within the tubular casing. Providing a tubular sealing gasket increases the fluid pressure at which the pipe coupling can operate. In use of the pipe coupling, as the casing is tightened around the pipe ends, the casing presses the sealing gasket against the outer surfaces of the pipe ends to form seals. Suitable sealing gaskets for use in a pipe coupling of this construction will be known to the skilled person, and may be made of resilient flexible material typically of rubber or synthetic rubber, or any other suitable material.

The pipe coupling may also further comprise a pair of arcuate anchoring rings for gripping the pipes, the rings being disposed in slots in the sealing gasket adjacent the opposite axial ends. Each anchoring ring is preferably frusto-conical. In a preferred embodiment, the slot adjacent the guide member has an open side, such that the respective anchoring ring further aligns and guides the pipe into the tubular sealing gasket.

Each arcuate anchoring ring preferably has inwardly projecting gripping teeth. Each anchoring ring preferably forms a complete ring. In a preferred embodiment a plurality of arcuate segments are provided which overlap to form the complete ring.

In the embodiments comprising anchoring rings, the ring is preferably formed in two segments. The segments comprise a major segment which subtends an arc of greater than 180° at the axis of the gripping ring and a minor segment which subtends an arc of less than 180° at the axis of the gripping ring. The casing is formed with a longitudinal gap and the tensioning means is arranged to reduce the longitudinal gap when tightened, the minor segment is located adjacent the longitudinal gap and the major segment is located to the side of the casing remote from the longitudinal gap, the major and minor segments overlapping one another on either side of the gap.

The tensioning system may be any suitable system for tensioning the tubular casing, such as those systems described in the applicant's patent GB 2447149, and applicant's pending applications GB 2447149, GB 2517979 and GB 1504006.6.

As such the tensioning system may comprise at least one fastener for tightening the casing around the pipes. In a preferred embodiment, the tensioning system comprises two fasteners. Providing two fasteners enables the pipe coupling to be tensioned at a first end to tighten the casing around a first pipe, before the second pipe to be guided by the guide member is inserted into the coupling. In this way, the process of coupling the pipes together in-situ may be simplified.

In one example, the free ends of the strip that forms the tubular casing are folded back on themselves and welded to form loops along opposite edges of a longitudinal gap. Pins are inserted in the loops. Tensioning bolts pass through transverse holes in one of the pins into tapped transverse holes in the other of the pins, so as to interconnect the two free ends of the outer casing. Slots are cut in the loops so as to provide clearance for the bolts.

In another example, the tensioning system comprises: a first pivoting member, extending radially from the first free end of the tubular casing; a second pivoting member, extending radially from the second free end of the tubular casing, having a projection located at a distal end of the second pivoting member and extending towards the first pivoting member; a bridge plate located inside the casing for spanning the longitudinal gap between the first free end and the second free end of the tubular casing; at least one fastener; and means for restraining radially the projection of the second pivoting member relative to the first pivoting member. Upon tightening the or each fastener, the first pivoting member and the second pivoting member pivot about the projection, and the first pivoting member and the second pivoting member resiliently bend about the first free end of the tubular casing and the second free end of the tubular casing respectively, such that each proximal end of the first pivoting member and the second pivoting member are drawn together to both tighten the casing around the outer surface of the pipe and to apply a radial force to the bridge plate.

By providing such a pair of pivoting members, the force applied to the tensioning system by the fastener can be translated into a circumferential force to tighten the casing around the outer surface of the pipes, and into a radial force on the bridge plate in the region of the longitudinal gap. By resiliently bending the pivoting members away from each other about the free ends of the casing, the resultant force applied to the casing is an inward radial force which in turn acts on the bridge plate. The bridge plate therefore applies an inward radial force in the region of the longitudinal gap to increase the resistance to fluid pressure in the pipes.

The pipe coupling may be suitable for any pipe having an external diameter of between about 21 mm and about 200 mm, but finds particular use for coupling pipes having an external diameter of about 60 mm. The pipe coupling of the present invention preferably also accommodates typical pipe tolerances in accordance with, for example, BS EN 877: 1999.

According to a further aspect of the present invention, there is provided an assembly comprising a pipe coupling substantially as described herein, and a first pipe, the pipe coupling being coupled to an end of the first pipe and configured to receive a second pipe to be radially aligned and guided into the tubular casing by the guide member.

Preferably, the tensioning system is tightened around the outer surface of the first pipe. In this way, the installation process may be simplified by requiring the installer to only tighten the pipe coupling around one pipe, not both pipes.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

The invention will be further described, by way of example only, with reference to the accompanying drawings in which:

FIG. 11 shows a further alternative guide member for a pipe coupling according to the present invention;

Figure 1:
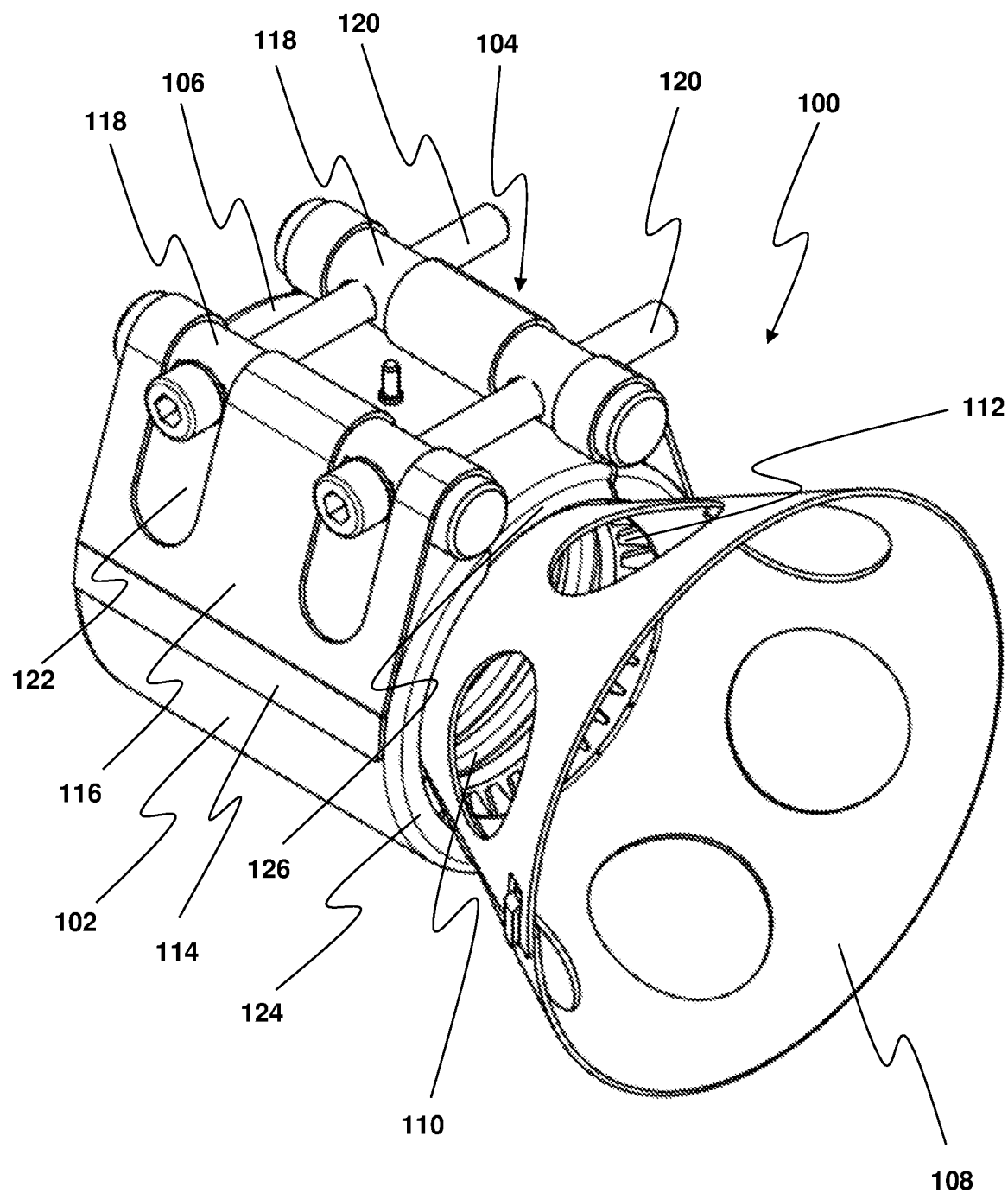
FIG. 1 shows a perspective view of a pipe coupling according to the present invention.
Figure 2:
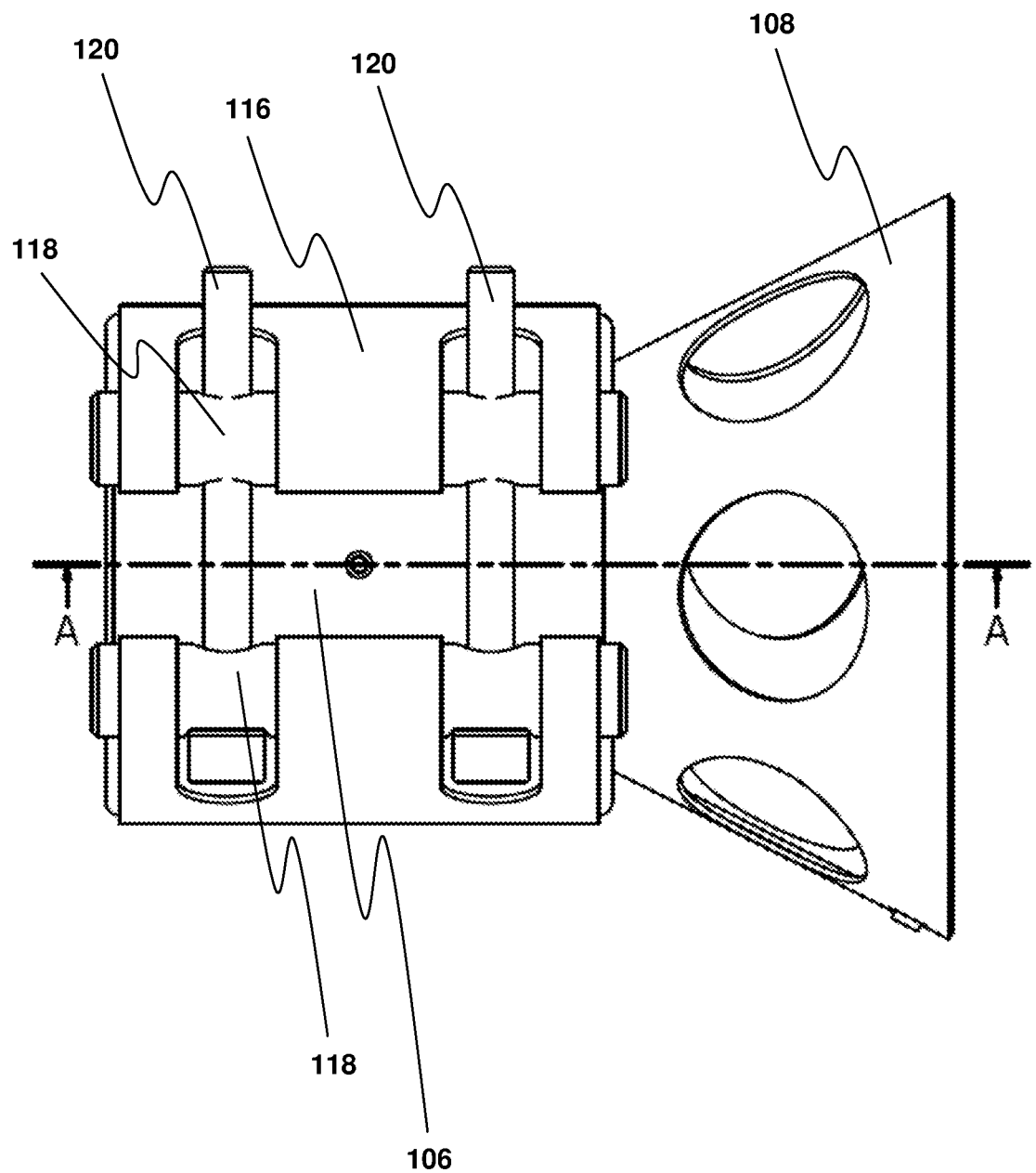
FIG. 2 shows a top view of the pipe coupling of FIG. 1.

FIGS. 1 and 2 show a pipe coupling 100 comprising a tubular casing 102, a tensioning system 104 for tightening the casing around a pipe, a bridge plate 106 and a guide member 108. The coupling 100 further comprises a sealing gasket 110 and two anchoring arrangements 112 disposed at either longitudinal end of the casing 102. The casing 102 is formed of a rolled steel strip, formed into a tube with a longitudinal gap between the free ends of the strip. The free ends of the strip that forms the casing are folded back on themselves and welded at 114 to form loops 116 along opposite edges of the longitudinal gap. Pins 118 are inserted in the loops. Tensioning bolts 120 pass through transverse holes in one of the pins 118 into tapped transverse holes in the other of the pins 118, so as to interconnect the two free ends of the outer casing. Slots 122 are cut in the loops 116 so as to provide clearance for the bolts. The axial end margins of the casing 102 are bent inwardly at right angles to the tubular web portion of the casing to form flanges 124 projecting inwardly towards the centre axis of the casing.

The bridge plate 106 of rolled steel is located inside the casing 102 and spans the longitudinal gap. The bridge plate is curved about the centre axis of the casing. The end margins of the bridge plate 106 are bent inwardly at right angles to the part-cylindrical web portion to form flanges 126 projecting inwardly towards the centre axis of the casing. The casing 102 on either side of the longitudinal gap overlaps the bridge plate. The axial length of the bridge plate is slightly less than that of the casing so that, where they overlap, the flanges 126 fit inside the flanges 124.

The sealing gasket 110 is of an elastomeric material, for example, rubber. The inner surface of the gasket is formed with two sets of annular sealing ribs which project inwardly towards the centre axis of the seal. Near its ends the inner side of the sealing gasket is formed with raised sealing surfaces. The gasket 110 fits inside the casing formed by the casing 102 and the bridge plate 106.

Figure 3:
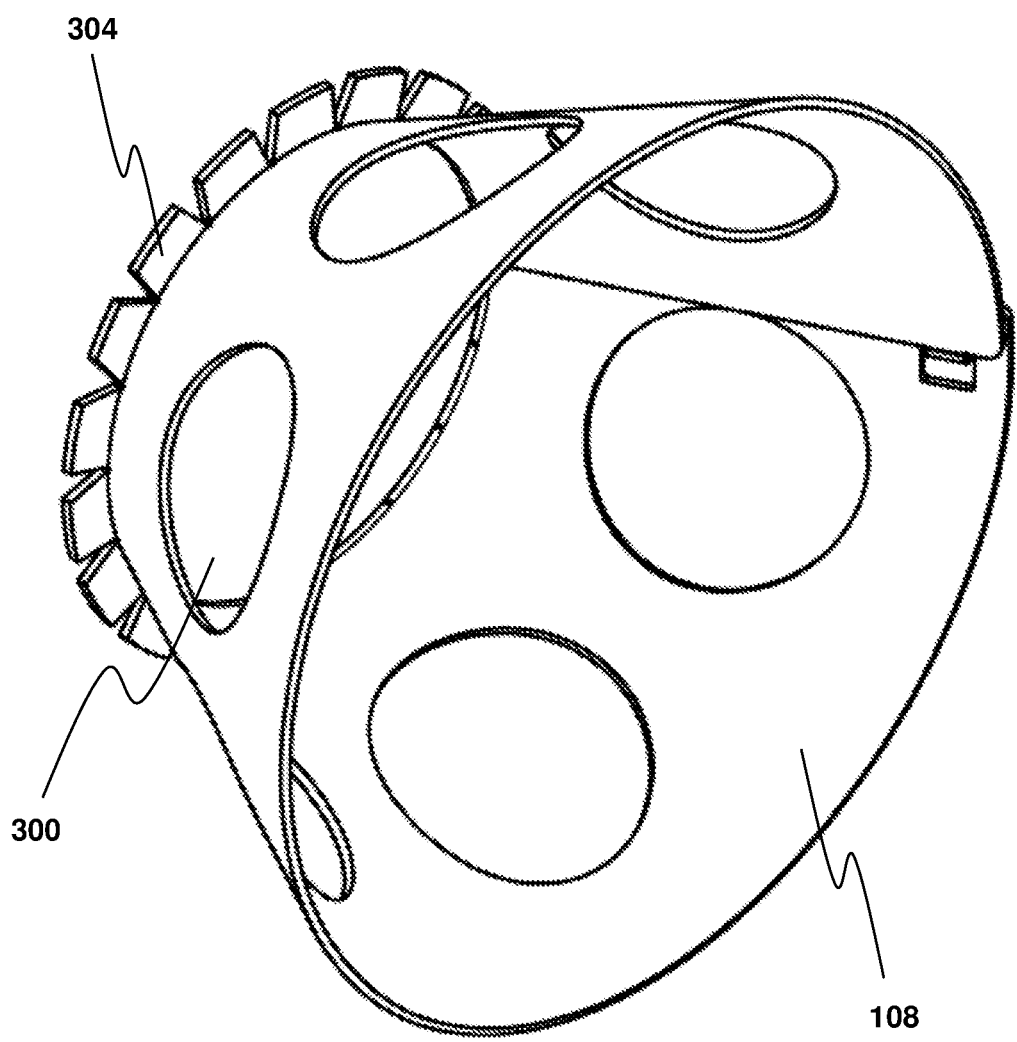
FIG. 3 shows a perspective view of a guide member of the pipe coupling of FIG. 1.

The guide member 108 is shown in detail in FIG. 3. It is frusto-conical and comprises through holes 300, and a plurality of tabs 304. The tabs project radially outwardly from the guide member 108, and are folded such that they are substantially parallel to the flanges 124, 126 when the guide member is coupled to the casing 102. As can be seen from FIG. 4, the tabs 304 of the guide member 108 are slidably retained in the casing by the flanges 124, 126, and by the anchoring ring 112.

Figure 4:
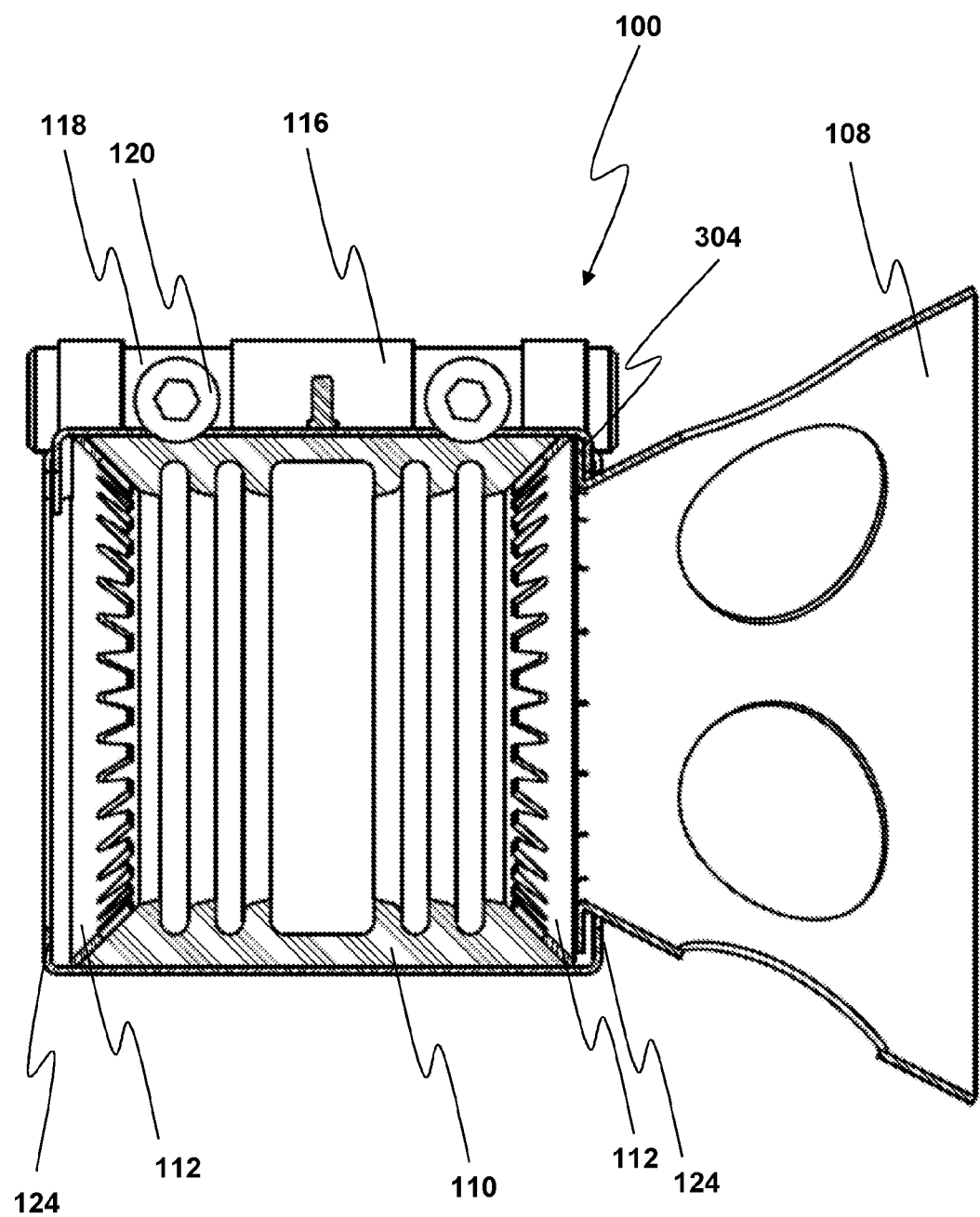
FIG. 4 shows a cross-sectional view, along the longitudinal axis, of the pipe coupling of FIG. 1.

As shown in FIG. 4, at each end of the gasket 110, a frusto-conical slot is formed in the outer surface of the gasket. The outer end of each slot lies at the axial end of the outer surface, the inner end of the slot lies close to the inner surface of the raised sealing surface. The slope of the slot is such that the inner end of the slot is nearer the axial middle of the gasket than the outer end. The outer side of each slot is removed to provide an open side.

The anchoring rings 112 are located in each slot. Each ring 112 is formed of two arcuate segments. The first segment is a minor segment and subtends at its centre of curvature an angle of less than 180°, say between 170° and 90°, typically approximately 140°. The second segment is a major segment and subtends at its centre of curvature an angle of more than 180°, say between 200° and 270°, typically approximately 250°. The segments are placed together in the slot so that they overlap in the regions either side of the bridge plate and form a complete frusto-conical ring. Alternatively, as described above, each ring may be formed of a single arcuate member extending such that the ends of the ring overlap forming a complete frusto-conical ring.

The anchoring rings are made of metal, preferably hard steel. The inner edges of the ring segments are cut at intervals to form teeth. When the coupling is assembled the teeth sit in the bottom of their respective slot and the outer edges of the ring segments sit in the angle formed by the flanges 124 and 126 and inner surfaces of the tubular web portions of the casing and the bridge plate.

Figure 5:
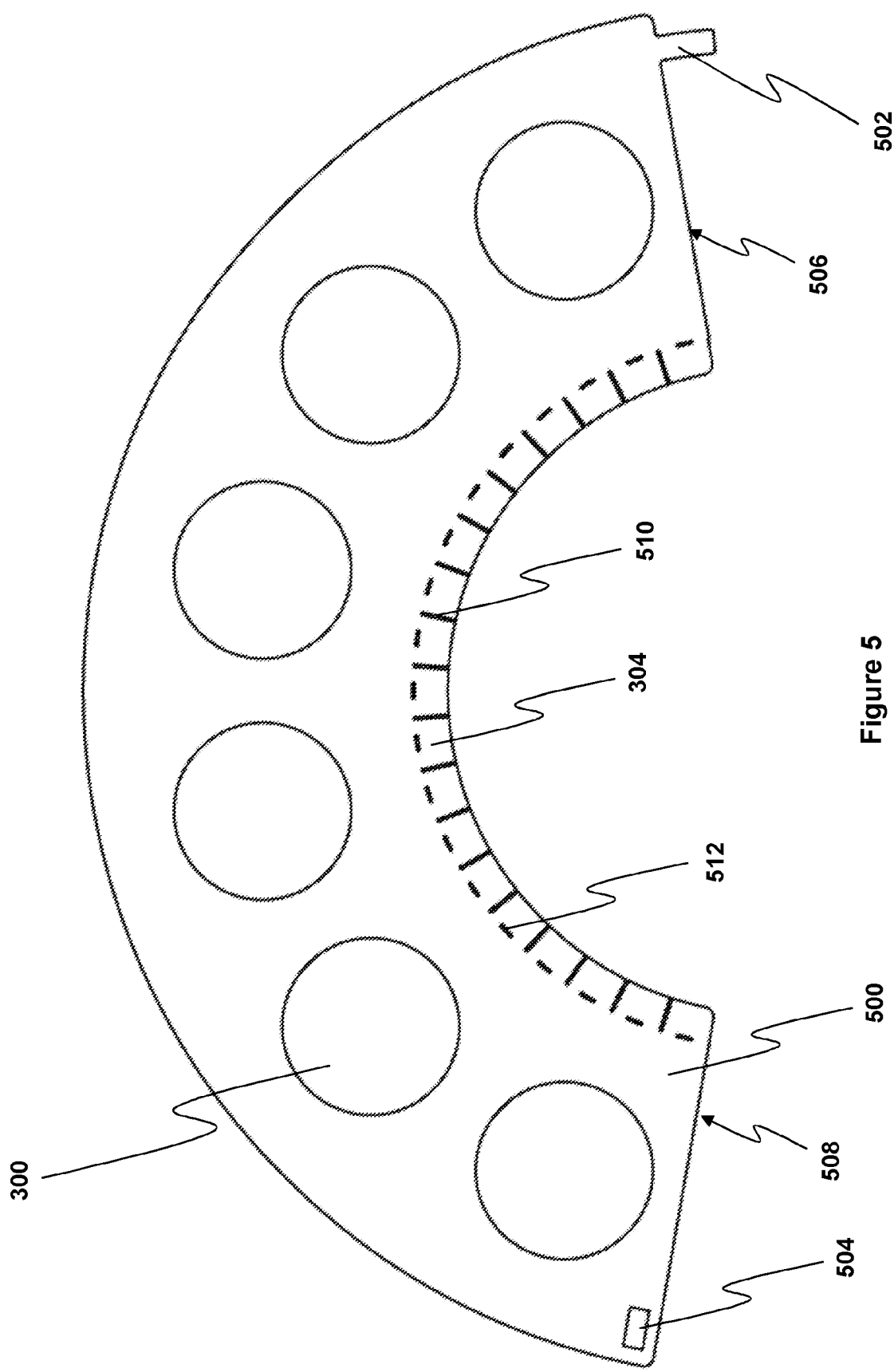
FIG. 5 shows a net used to form the guide member of FIG. 3.

The guide member 108 is of rolled steel, and as can be seen from FIG. 5, is formed from a flat plate 500 cut to the required arcuate shape. The flat plate comprises a tab 502 and a corresponding hole 504 disposed at either end of the plate. To form the guide member 108 the flat plate is rolled or otherwise curved to bring the edge 506 to the edge 508, and then the tab 502 is folded through the hole 504 to retain the guide member 108 in the required frusto-conical shape. The tabs 304 are formed by the plurality of cuts 510, and the plurality of cuts 512 enable the tabs to be folded as described above.

Figure 6:
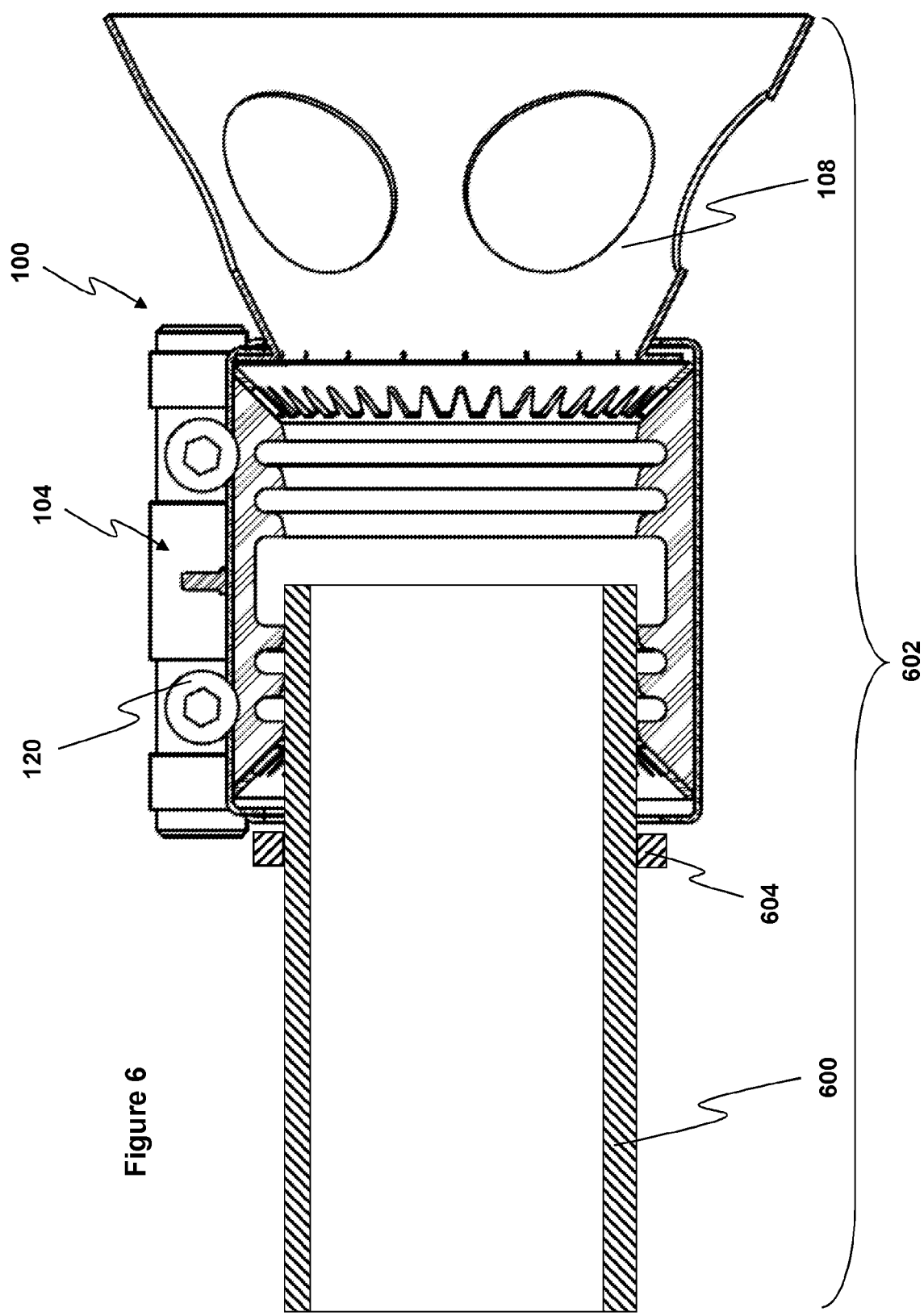
FIG. 6 shows a cross-sectional view of an assembly of the pipe coupling of FIG. 1, and a pipe.
Figure 7:
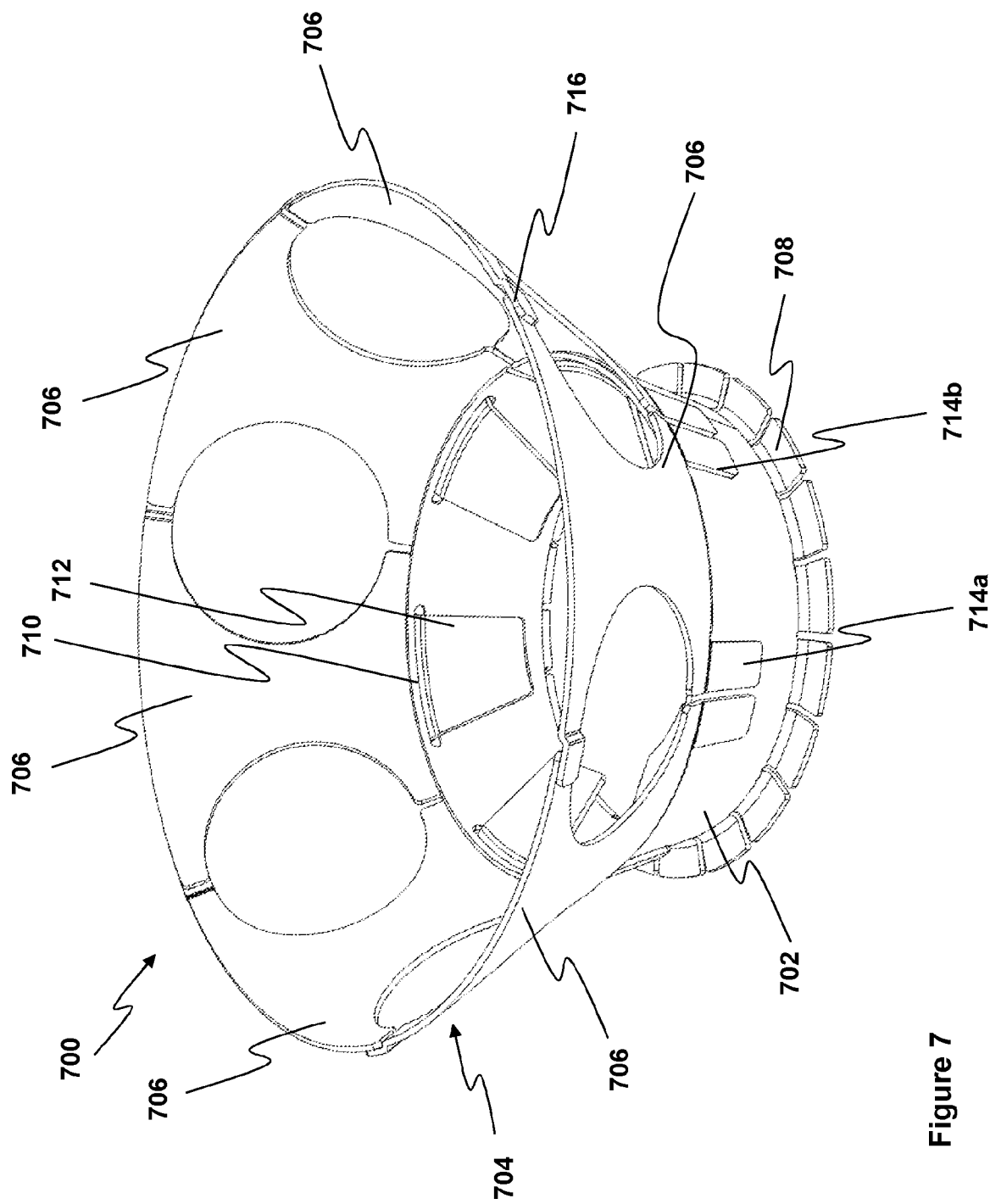
FIG. 7 shows an alternative guide member for a pipe coupling according to the present invention.
Figure 8:
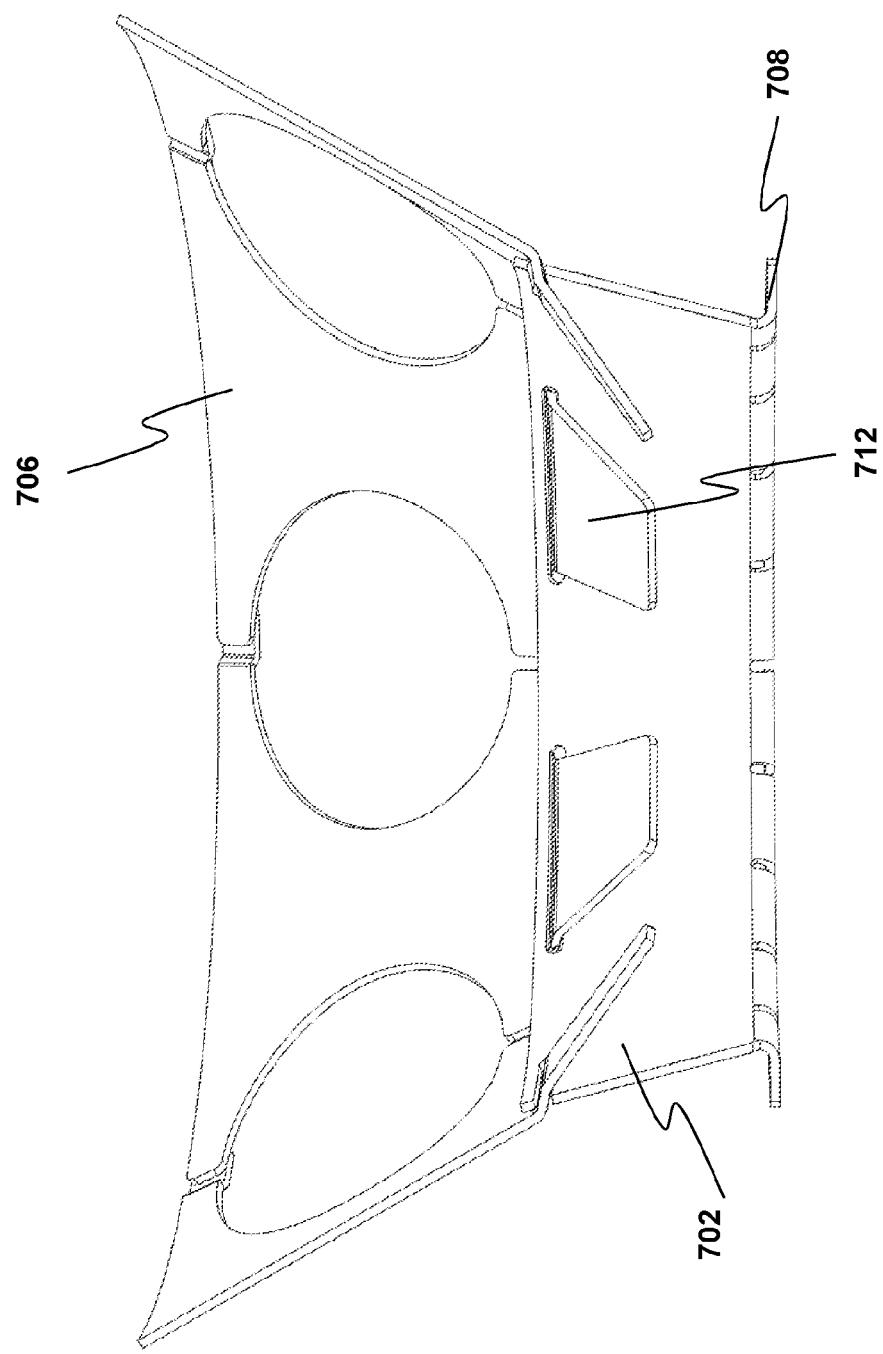
FIG. 8 shows a cross-sectional view of the guide member shown in FIG. 7.
Figure 10:
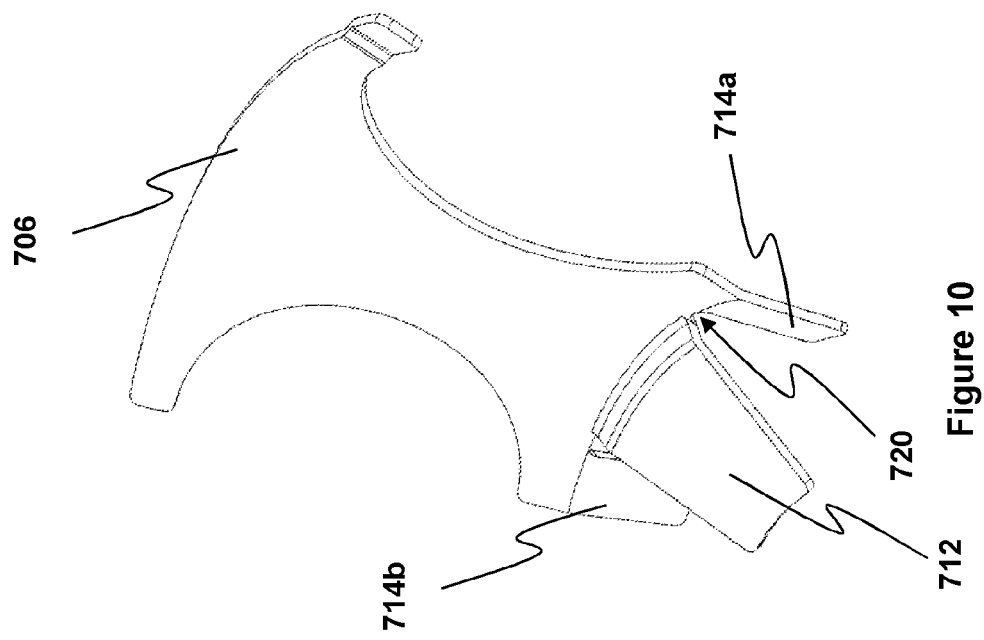
FIG. 10 shows a further portion of the guide member shown in FIGS. 7 and 8.
Figure 9:
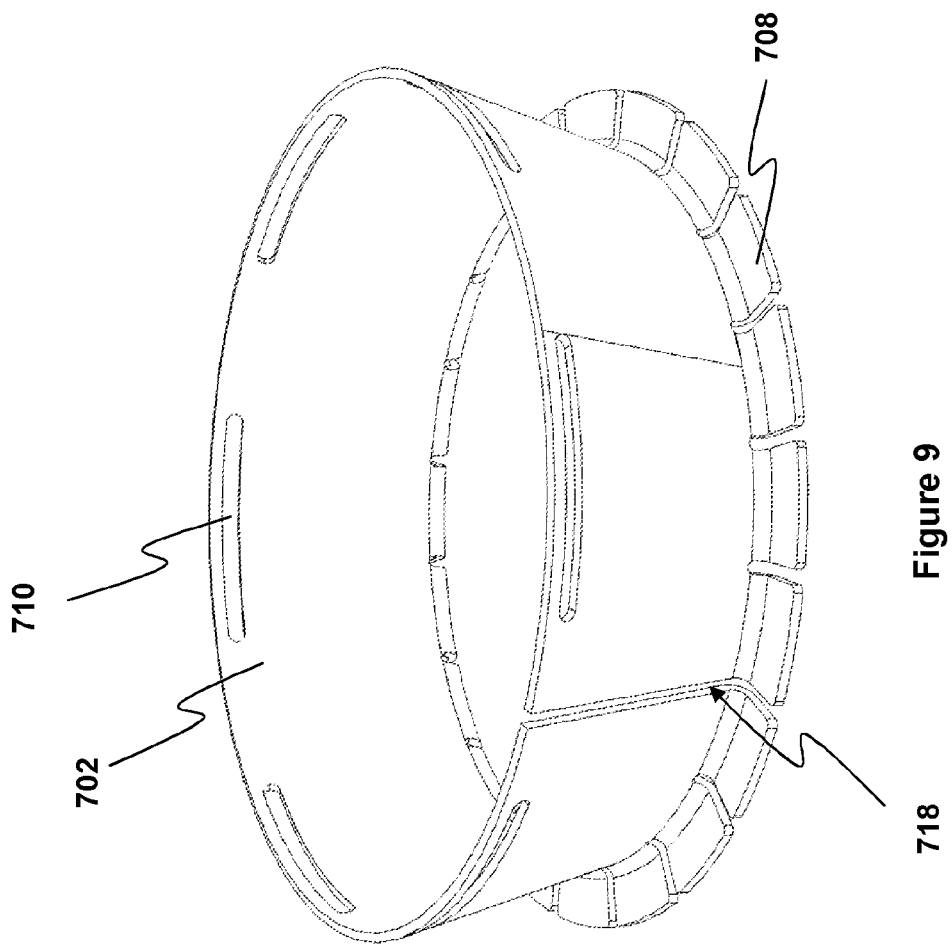
FIG. 9 shows a portion of the guide member shown in FIGS. 7 and 8.
Figure 12:
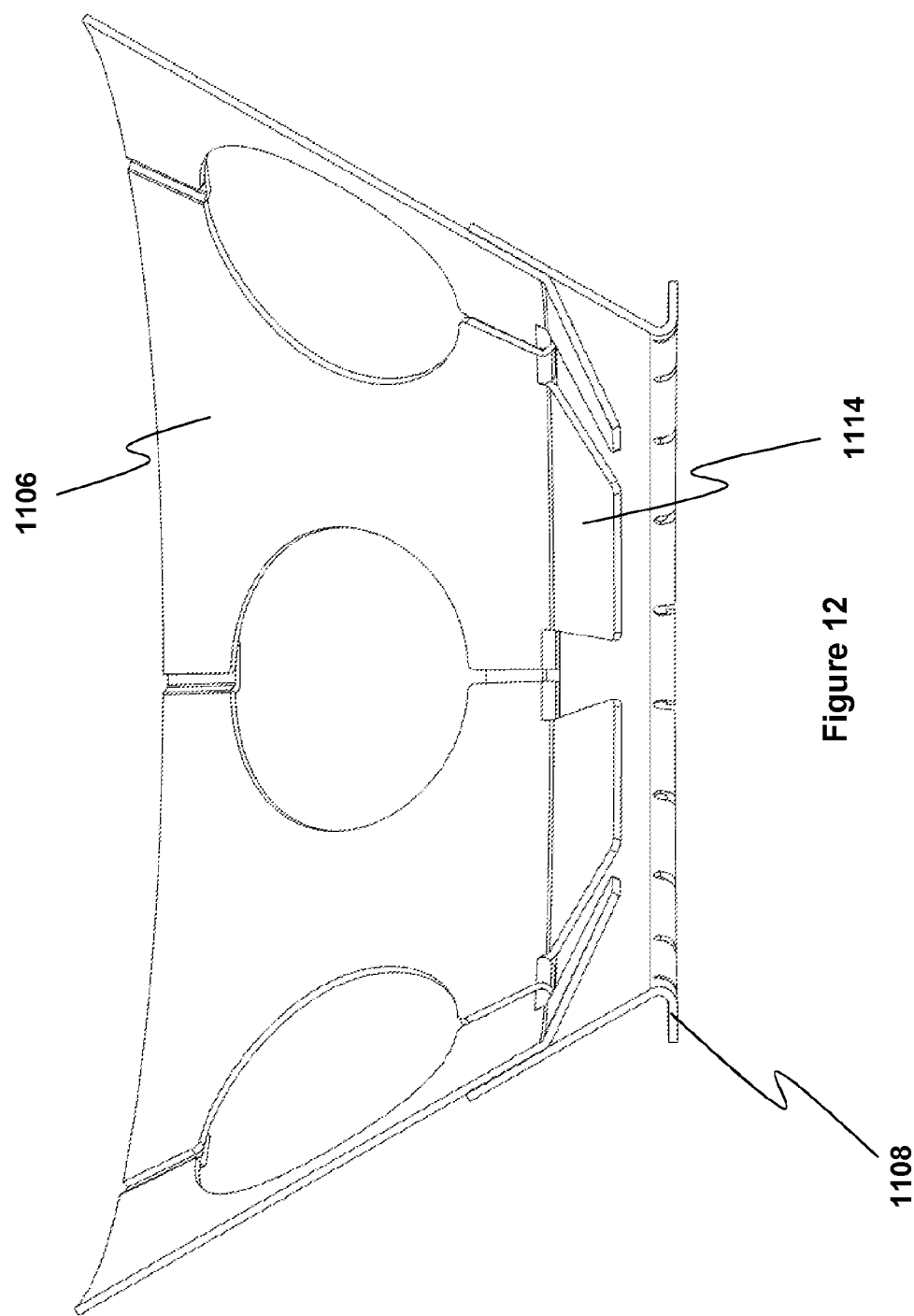
FIG. 12 shows a cross-sectional view of the guide member shown in FIG. 11.
Figure 14:
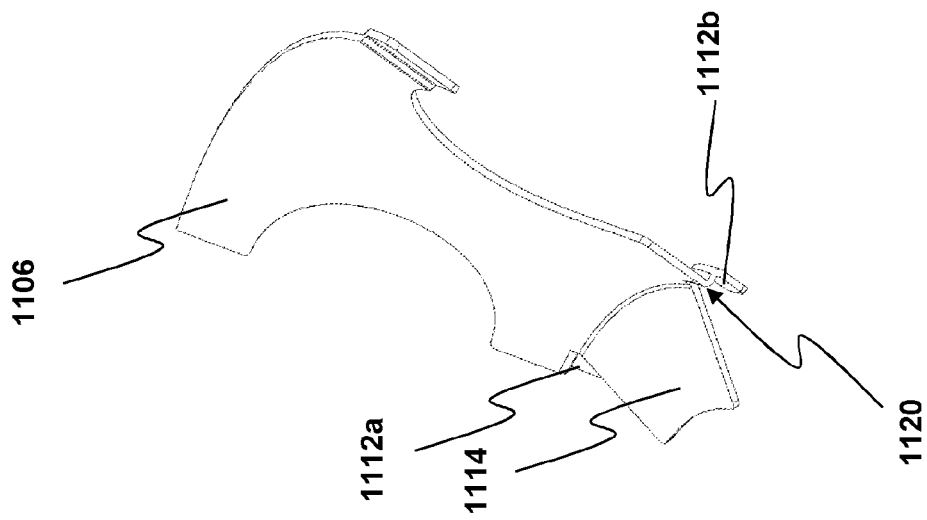
FIG. 14 shows a further portion of the guide member shown in FIGS. 11 and 12.
Figure 13:
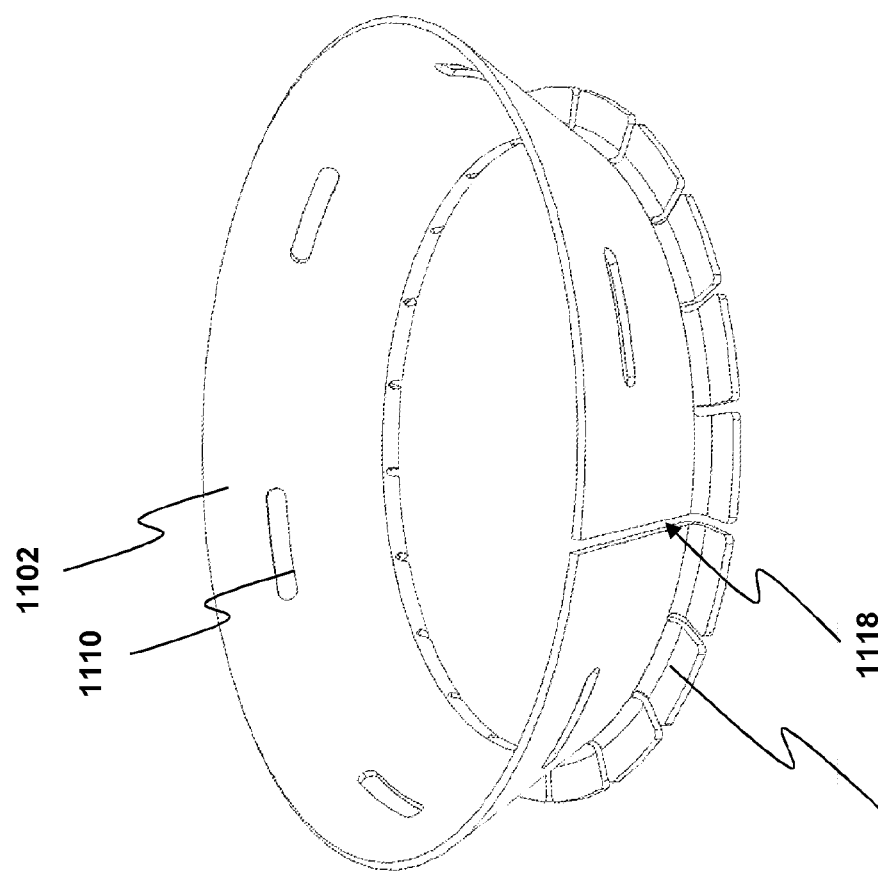
FIG. 13 shows a portion of the guide member shown in FIGS. 11 and 12.

In use, a first end of the pipe coupling is coupled to a first pipe 600 as shown in FIG. 6. The first end of the plain ended pipe 600 is inserted into the coupling, and abuts a projection 604, such as a split ring welded, or the like, to the outer surface of the pipe 600. With the coupling in place around the first end of the first pipe, one of the bolts 120 is tightened to clamp the coupling to the pipe in the region surrounding that pipe. The other end of the pipe coupling, comprising the guide member, is not tightened and as such is suitable for receiving a second pipe.

Such an assembly 602 is of particular use in constructing cast in-situ pilings, but may be used in other scenarios.

The process of casting piles in-situ involves boring the pile, lowering reinforcement cage into the pile, and pouring concrete into the pile to form the piling. Often, piles are too deep to use a single section of cage, and therefore in these situations multiple sections of cage are connected to each other as they are lowered into the pile. To ensure the integrity of the pile, pipes are lowered in within the reinforcement caging to enable testing. In addition, pipes may be provided which enable base grouting once the concrete has been poured and is sufficiently stable. Since pilings may be 100 m or more deep, multiple sections of piping are required, which must be coupled together in a fluid tight manner. Often the sections of piping are the same length as the sections of cage and are coupled together at the same time as the cage sections are connected together.

The pipe 600 of the assembly 602 which may be 10 m, 12 m, or more in length, is lowered into the bored piling hole with the reinforcement cage for the piling. Once the pipe coupling 100 is adjacent the top of the hole, the cage and pipe are held in place while a further cage and pipe is lowered into position to be connected to the cage and pipe in the hole. As will now be appreciated, as the further cage and pipe are lowered, the further pipe is guided into the pipe coupling by the guide member with minimal, if any, intervention by the installer. A self-aligning pipe coupling is therefore provided by the present invention. An elongate arm may be used to ensure the pipe is received in the guide member 108, but may not be required. The cone angle of the guide member 108 is approximately 40 degrees which has been found to be most effective at radially aligning the further pipe with the casing as it is lowered into position.

This operation may be performed vice versa such that the end of the pipe having the pipe coupling is lowered onto a plain end pipe already provided in the bore hole.

Once the further cage and pipe have been lowered such that they are engaged with the cage and pipe already in the hole, the cages are attached together, and the installer uses an elongated tool to tighten the other tensioning bolt 120. At no time is there a requirement for the installer to place their hands into the cage to manually manoeuvre the pipe or coupling.

When installing each section of pipe, as the bolts 120 are tightened, the edges of the casing 102 on either side of the longitudinal gap are drawn together, thereby causing the casing to apply a radially compressive force to the sealing gasket and the frusto-conical ring. The bridge plate 106 is arranged so that it spans the longitudinal gap. In this way the bridge plate supports the gasket in the region of the gap where there is no support from the casing 102.

The tightening of the tensioning bolts 120 presses the annular sealing ribs into sealing contact with the outer surfaces of the pipe ends. At the same time, the anchoring ring 112 is pushed inwardly towards the centre axis of the coupling by the casing 102 and the bridge plate 106, the outer edge of the ring being gripped by the casing in the angle between the cylindrical web portion of the casing and the flanges 124 and 126. The compression of the gripping ring causes the edges of its teeth to penetrate through the gasket 110 at the bottom of the slot and bite into the surface of the pipe, thereby anchoring the coupling to the pipe against axial movement. The overlapping parts of the ring segments can slide over one another in the slot allowing the ring to shrink in diameter as it is compressed by the tightening of the casing. The angle of approximately 45 degrees which is established between the ring and the pipe surface when the ring first bites is maintained as the coupling is tightened.

Once all of the sections of cage and pipe are in the hole, the concrete is poured. The through holes 300 in the guide member enable the concrete to flow into and around the guide member to prevent voids which may reduce the integrity of the piling.

The installed pipes may then be used to conduct ultrasonic testing of the piling to determine whether it has any voids, and/or may be used to carry out base grouting of the piling once the concrete is sufficiently stable. The pipe coupling of the present invention is particularly advantageous in this respect because it is easy to install, but provides significant resistance to external and internal fluid pressures which prevent the ingress of concrete during the concrete pour, but also prevent the grouting from leaking during the base grouting process where pressures up to and exceeding 80 bar are often required.

FIGS. 7 to 16 show alternative examples of guide members suitable for use with the above described pipe coupling. The guide members operate in substantially the same manner as described above, guiding the pipe into engagement with the tubular casing of the pipe coupling without the requirement for the user to use their hands to manually guide the pipe into the coupling.

FIGS. 7 to 14 show two examples of guide members which articulate to rotate portions of the guide member into the pipe on insertion of the pipe into the pipe coupling.

The example shown in FIGS. 7 to 10 has the following components, and operates in the following manner. The guide member 700 comprises a first portion 702 and a second portion 704. The second portion is formed from six articulation members 706. The first portion of the guide member 702 comprises a plurality of tabs 708 configured to engage with the tubular casing of the pipe coupling in a manner similar to that described above with reference to tabs 304.

The first portion of the guide member comprises six elongate slits 710 disposed annularly about the first portion 702. Each elongate slit is configured to receive an activation tab 712 of an articulation member 706. In this example, the activation tab 712 is inserted through the elongate slit 710 from the outside of the first portion of the guide member. In addition, each articulation member 706 comprises two articulation tabs 714*a* and 714*b*. When in this first position, ready to receive a pipe, the articulation tabs abut an outer surface of the first portion 702 of the guide member. The tabs 714*a*, 714*b* are formed of folded portions of the articulation member 706, the member being formed of steel or the like.

As can be seen, the activation tabs 712 are folded such that the effective cone angle of the frusto-conical portion formed by the activation tabs is greater than the effective cone angle of the frusto-conical second portion 704 of the guide member. In this way, the tabs 712 are able to move towards the first portion 702 of the guide member upon insertion of the pipe.

In addition, each articulation member 706 comprises a stop tab 716 on a first edge configured to abut an outer surface of an adjacent articulation member on a corresponding second edge. The stop tab 716 prevents the articulation members from rotating away from the centre of the pipe coupling, and thus maintains the guide member in the frusto-conical shape. Finally, as can be seen, each articulation member 706 comprises cut outs to form holes in the guide member to enable the flow of concrete around the guide member in a manner as described above.

The first portion 702 of the guide member is formed of an arcuate flat sheet, and sized such that a gap 718 is formed between adjacent ends. The gap enables the guide member to reduce in diameter upon tightening of the pipe coupling about the pipe.

As mentioned above, in use, the articulation members 706 rotate, about pivot points 720, upon an end of a pipe engaging with the activation tabs 712 when the pipe is inserted into the pipe coupling.

The example shown in FIGS. 11 to 14 has the following components, and operates in the following manner.

The example shown in FIGS. 11 to 14 has the following components, and operates in the following manner. The guide member 1100 comprises a first portion 1102 and a second portion 1104. The second portion is formed from six articulation members 1106. The first portion of the guide member 1102 comprises a plurality of tabs 1108 configured to engage with the tubular casing of the pipe coupling in a manner similar to that described above with reference to tabs 304.

The first portion 1102 of the guide member comprises six elongate slits 1110 disposed annularly about the first portion 1102. Each elongate slit is configured to receive two articulation tabs 1112a and 1112b of two adjacent articulation members 1106; the tab 1112a being from a first articulation member and the tab 1112b being from a second articulation member adjacent to the first. In this example, the articulation tabs 1112a and 1112b are inserted into the elongate slits from the inside of the first portion of the guide member. In addition, each articulation member 1106 comprises an activation tab 1114. When in this first position, ready to receive a pipe, the articulation tabs abut an outer surface of the first portion 1102 of the guide member. The tabs 1112a, 1112b are formed of folded portions of the articulation member 1106, the member being formed of steel or the like.

As can be seen, the activation tabs 1114 are folded such that the effective cone angle of the frusto-conical portion formed by the activation tabs is greater than the effective cone angle of the frusto-conical second portion 1104 of the guide member. In this way, the tabs 1114 are able to move towards the first portion 1102 of the guide member upon insertion of the pipe.

In addition, each articulation member 1106 comprises a stop tab 1116 on a first edge configured to abut an outer surface of an adjacent articulation member on a corresponding second edge. The stop tab 1116 prevents the articulation members from rotating away from the centre of the pipe coupling, and thus maintains the guide member in the frusto-conical shape. Finally, as can be seen, each articulation member 1106 comprises semi-circular cut outs to form holes in the guide member to enable the flow of concrete around the guide member in a manner as described above.

The first portion 1102 of the guide member is formed of an arcuate flat sheet, and sized such that a gap 1118 is formed between adjacent ends. The gap enables the guide member to reduce in diameter upon tightening of the pipe coupling about the pipe.

As mentioned above, in use, the articulation members 1106 rotate, about pivot points 1120, upon an end of a pipe engaging with the activation tabs 1114 when the pipe is inserted into the pipe coupling.

Figure 15:
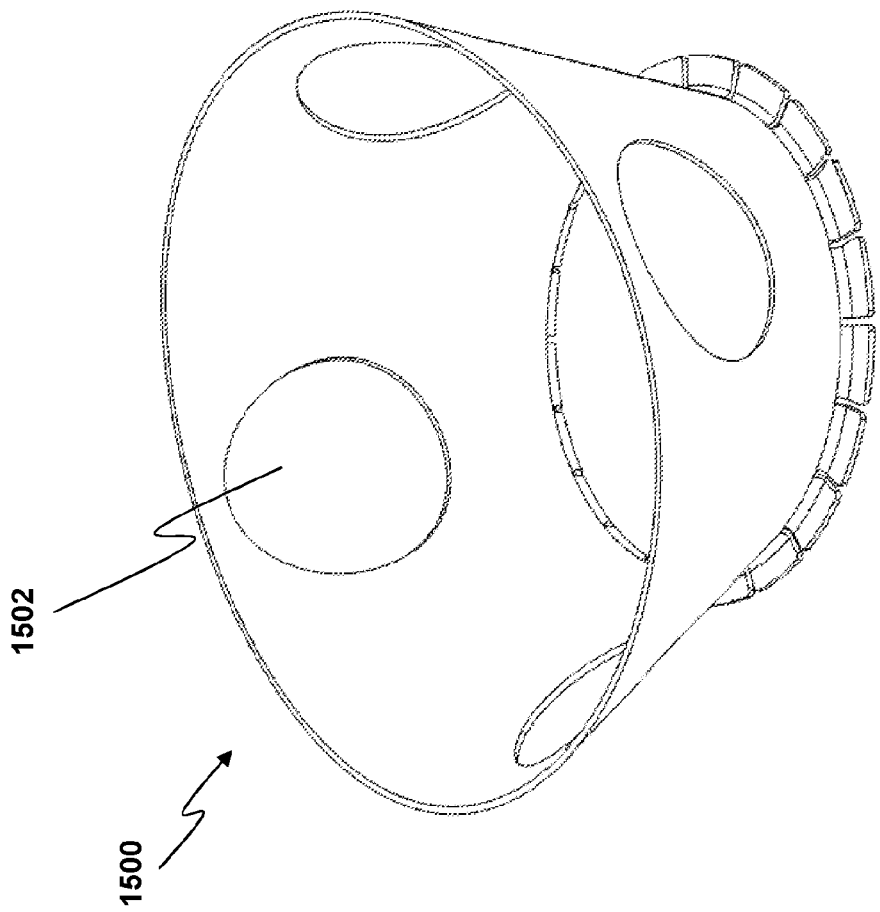
FIG. 15 shows a yet further alternative guide member for a pipe coupling according to the present invention.
Figure 16:
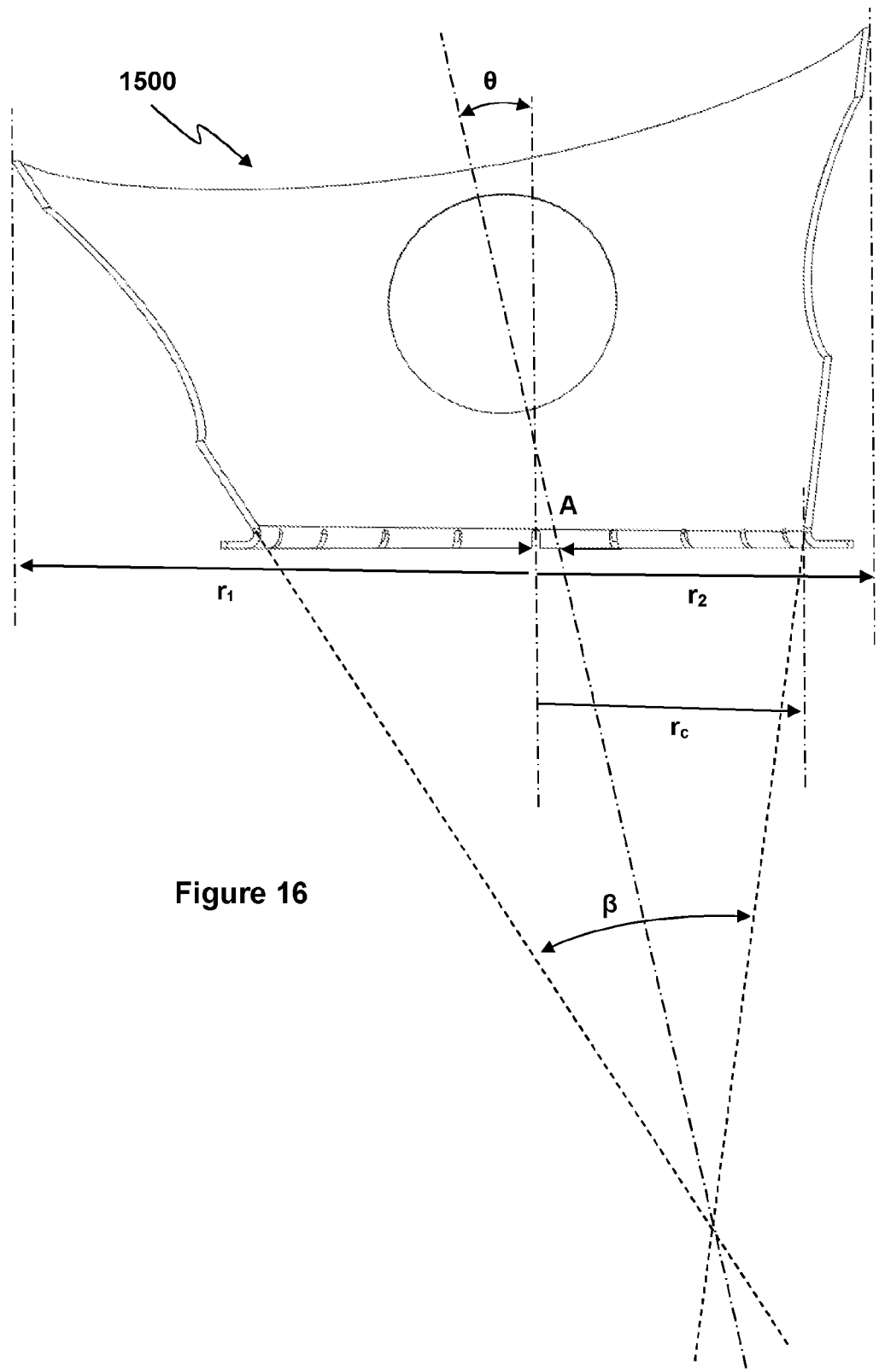
FIG. 16 shows a cross-sectional view of the guide member shown in FIG. 15.

FIGS. 15 and 16 show a further alternative guide member 1500 for use in a pipe coupling as described herein. As can be seen, the guide member 1500 is similar to the guide member 108 described above, has holes 1502 as described with reference to guide member 108, and is formed in a similar manner.

The guide member 1500 is configured such that the longitudinal axis of the frusto-conical guide member is at an angle to a longitudinal axis of the pipe coupling (when the guide member is coupled to the tubular casing). Providing a guide member with an angular offset reduces the clearance required between one side of the pipe coupling and the reinforcement cage of the piling. In effect, an eccentric guide member is thus provided.

In this example, and as shown in FIG. 16 in particular, the longitudinal axis of the frusto-conical guide member is provided at an angle, $\theta$, of about 30 degrees to the longitudinal axis of the pipe coupling. The longitudinal axis of the frusto-conical is also displaced, by distance A, from the longitudinal axis of the pipe coupling, at the first axial end of the tubular casing, such that the apparent radius, $r_1$, $r_2$, of the free end of the guide member is greater than the radius, $r_c$, of the inner surface of the tubular casing. In this way, any point of the free end of the guide member, when projected to the first axial end of the tubular casing, falls outside of the inner surface of the tubular casing, enabling the pipe to be inserted more easily.

In this example, the frusto-conical guide member 1500 has a cone angle, $\beta$, of about 40 degrees.

The invention claimed is:

1. A pipe coupling for connecting together ends of two pipes, the pipe coupling comprising:
   a tubular casing for fitting around the ends of the two pipes, wherein the casing is a generally U-shaped cross-section having a web portion with flanges projecting radially inwardly from axial ends of the web portion to define an annular channel, and a guide member comprising a plurality of tabs, wherein an annular flange at a first axial end of the casing couples the guide member to the casing by retaining the plurality of tabs;
   a tensioning system for tightening the casing around an outer surface of the two pipes; and
   the guide member being coupled to and extending, axially outwardly, away from the first axial end of the tubular casing, for radially aligning and guiding one of the pipes into the tubular casing, the guide member being frusto-conical, a diameter of a free end of the guide member being greater than a diameter of an end coupled to the casing.

2. A pipe coupling according to claim 1, the guide member being configured such that a longitudinal axis of the frusto-conical guide member is at an angle to a longitudinal axis of the pipe coupling.

3. A pipe coupling according to claim 2, wherein the longitudinal axis of the frusto-conical guide member is at an angle of between about 10 degrees and about 40 degrees to the longitudinal axis of the pipe coupling.

4. A pipe coupling according to claim 2, wherein the longitudinal axis of the frusto-conical is displaced from the longitudinal axis of the pipe coupling at the first axial end of the tubular casing, such that an apparent radius of the free end of the guide member is greater than a radius of an inner surface of the tubular casing.

5. A pipe coupling according to claim 1, wherein the diameter of the free end of the guide member is between about 1.5 times and about 3 times the diameter of the end coupled to the casing.

6. A pipe coupling according to claim 1, wherein a cone angle of the guide member is between about 30 degrees and about 90 degrees.

7. A pipe coupling according to claim 1, wherein the guide member comprises a plurality of elongate fingers, each finger extending radially and axially from the first axial end of the casing.

8. A pipe coupling according to claim 7, wherein the guide member comprises at least three fingers.

9. A pipe coupling according to claim 1, wherein the guide member comprises a first portion coupled to the first axial end of the tubular casing, and a second portion, wherein the second portion of the guide member comprises a plurality of articulated members configured to rotate about the first portion upon insertion of a pipe into the tubular casing via the guide member.

10. A pipe coupling according to claim 9, wherein each articulated member comprises an activation tab configured to radially project inwardly from the guide member, wherein upon insertion of a pipe into the tubular casing, the pipe acts on each tab to rotate each articulated member such that a free end of the guide member moves towards the pipe.

11. A pipe coupling according to claim 9, wherein each articulated member comprises at least two articulation tabs configured to engage with the first portion of the guide member to enable articulation.

12. A pipe coupling according to claim 11, wherein said first portion of the guide member comprises a plurality of elongate slits, each slit configured to receive a respective one of an activation tab, the articulation tabs being configured to abut an outer surface of the first portion of the guide member adjacent said elongate slit.

13. A pipe coupling according to claim 11, wherein said first portion of the guide member comprises a plurality of elongate slits, each slit configured to receive an articulation tab from a first articulation member and an articulation tab from a second articulation member adjacent the first articulation member.

14. A pipe coupling according to claim 9, wherein each articulation member comprises a stop, on a first edge, configured to engage with a second edge of an adjacent articulation member to form the frusto-conical guide member from the plurality of articulation members.

15. A pipe coupling according to claim 14, wherein the second edge of the articulation member comprises a recess configured to receive the stop.

16. An assembly comprising a pipe coupling according to claim 1, and a first pipe, the pipe coupling being coupled to an end of the first pipe, and configured to receive a second pipe to be radially aligned and guided into the tubular casing by the guide member.

17. An assembly according to claim 16, wherein said first pipe comprises an annular platform configured to abut a first end of said pipe coupling, so as to longitudinally locate said pipe coupling on said first pipe.

18. An assembly according to claim 16, wherein the tensioning system is tightened around the outer surface of the first pipe.

* * * * *